United States Patent

Komline

[15] 3,667,614

[45] June 6, 1972

[54] FILTERING APPARATUS

[72] Inventor: Thomas R. Komline, Gladstone, N.J.

[73] Assignee: Komline-Sanderson Engineering Corporation, Peapack, N.J.

[22] Filed: Feb. 4, 1970

[21] Appl. No.: 8,531

[52] U.S. Cl. ........................................................210/401
[51] Int. Cl. ........................................................B01d 33/14
[58] Field of Search ..................................................210/401

[56] References Cited

UNITED STATES PATENTS 3,017,997  1/1962   Hawkes et al...........................210/401
3,419,150  12/1968  Davis......................................210/401

Primary Examiner—Reuben Friedman
Assistant Examiner—T. A. Granger
Attorney—Watson, Cole, Grindle & Watson

[57] ABSTRACT

A rotary drum-type vacuum filter in which the grids which support the flexible filter medium over the filtering compartments of the drum are respectively formed to provide one or more corrugations extending generally in the direction of the drum axis and defining one or more channels, said corrugations also defining valleys in addition to said channels and into which the flexible filter medium is sucked during its immersion in the slurry being filtered to form corrugations in the filter media which mate with said valleys. Thereafter, when the filter medium emerges from the slurry with a filter cake formed thereon said mating corrugations, the channels are eliminated by removal of the filter medium from the drum for passage on to the discharge roll. Such elimination of the mating corrugations from the flexible filter medium and the resulting elongation of the filter medium relative to the less flexible filter cake, facilitates the separation of the cake from the medium.

3 Claims, 4 Drawing Figures

INVENTOR.
THOMAS R. KOMLINE
BY Watson, Cole, Grindle & Watson
ATTORNEYS

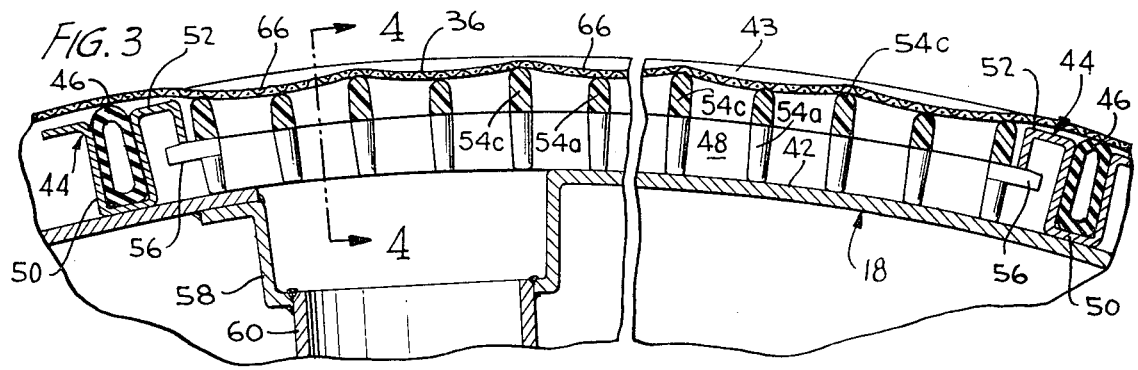
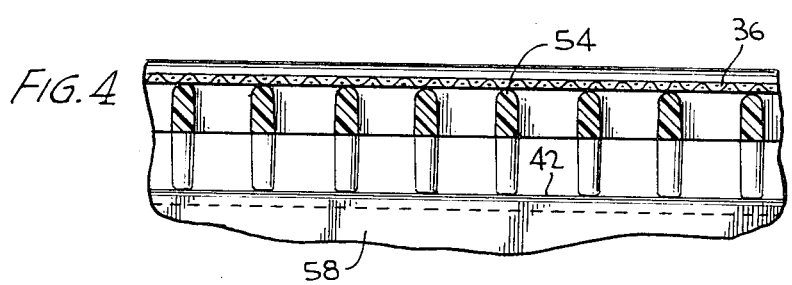

FILTERING APPARATUS

This invention relates to improvements in filter units of the rotary drum type, and is particularly applicable to such units of the class which employ belt type discharge.

In the filtration or dewatering of various types of slurries or sludges, and particularly undigested sewage sludge, there is generally sufficient fiber in the sludge that the filter cake tends to be quite cohesive and thus tends to be discharged from the filter unit in large slabs or sections, making it necessary to shred or break up the filter cake into smaller pieces prior to its subsequent treatment.

Mechanism for the shredding or breaking up the filter cake is expensive and not completely satisfactory, especially from a maintenance standpoint.

With these considerations in mind, it is a primary object of the present invention to provide a filter unit in which the filter cake is discharged from the unit in sufficiently small pieces to permit its further handling without the necessity for such additional shredding or breaking mechanisms.

Thus, in accordance with the invention, the various grids, by means of which the filter cloth is supported on the drum and in spaced relation to the filter deck, are formed to define valleys across the face of the filter drum into which the filter media is sucked and deformed as the filter cake is formed thereon during its immersion in the sludge to form corrugations in said medium which mate with said valleys. After its emergence from the sludge, the corrugation thus formed in the flexible filter medium are eliminated, thereby tending to flex and break the inherently less flexible filter cake and to initiate its separation from the filter medium.

Where the invention is employed in conjunction with a belt discharge type of filter, the filter medium may effectively be formed with a plurality of corrugations extending thereacross and on which the filter cake is conformingly deposited, to be thereafter broken and loosened as the filter medium leaves the filter drum to follow a rectilinear path onto the discharge roll. The resulting straightening out of the filter medium and its elongation with respect to the corrugated filter cake tends effectively to loosen and break the filter cake in the zones of the respective channels to thereby greatly facilitate the discharge of the filter cake in relatively small pieces upon passing around the discharge roll.

In order to facilitate a rapid and comprehensive understanding of the invention, I have herein shown and described the preferred embodiment of the invention together with certain modifications thereof, as will be more apparent upon consideration of the following detailed description considered in conjunction with the accompanying drawings, in which:

FIG. 3 is an enlarged detail fragmentary section on the line 3—3 of FIG. 2 showing therein the improved grid conformation in accordance with the preferred embodiment of the invention.

FIG. 4 is a detailed fragmentary sectional view on the line 4—4 of FIG. 3.

Figure 1:
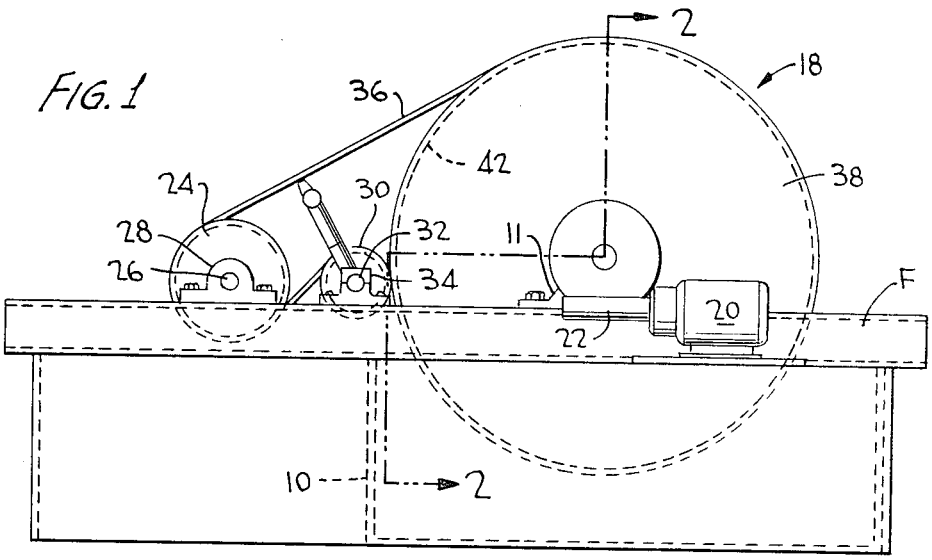
FIG. 1 is a side elevation of a generallly conventional belt discharge type of filter unit to which the preferred embodiment of the invention is applied.
Figure 2:
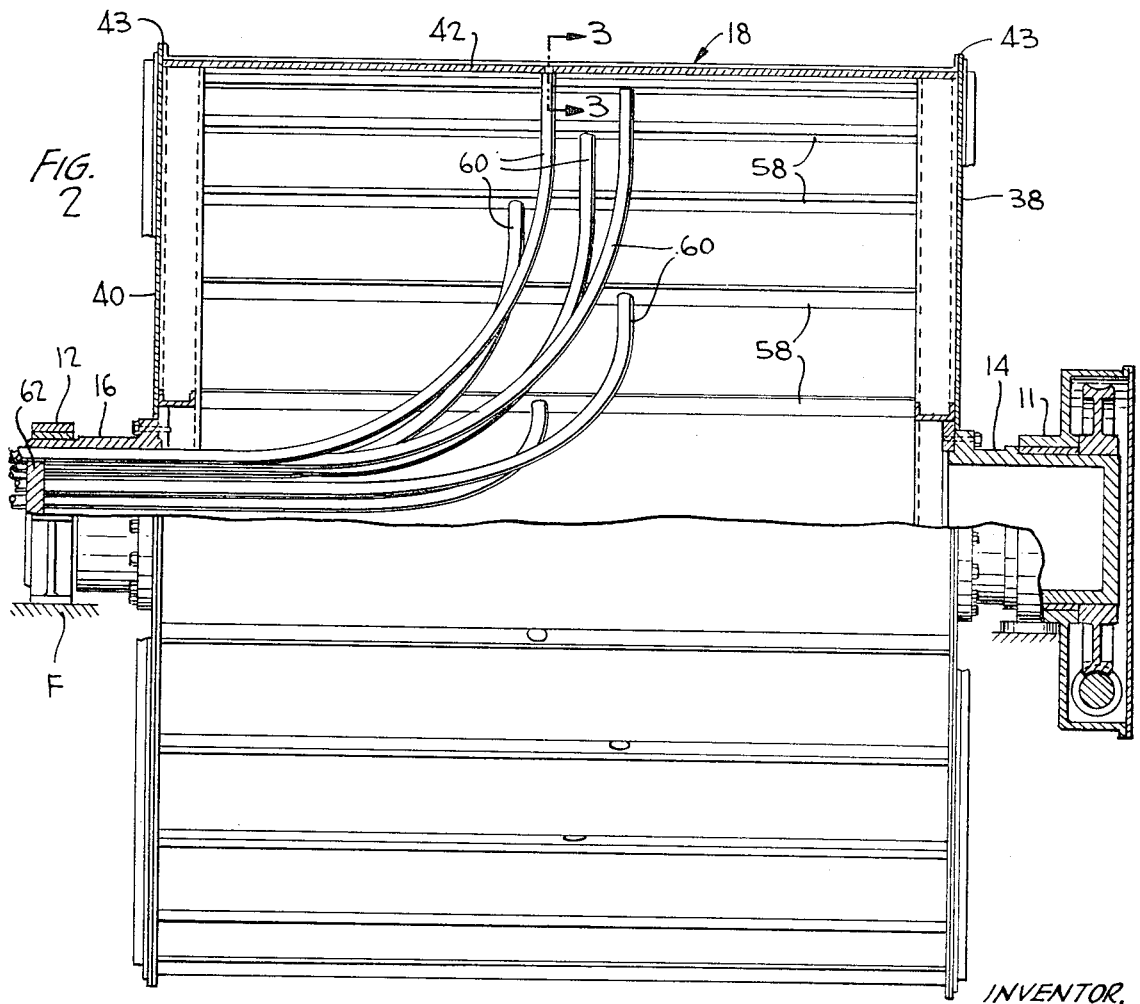
FIG. 2 is a view partly in elevation and partly in section on the line 2—2 of FIG. 1.

In its preferred form, as illustrated in the drawing, the invention is embodied in a generally conventional rotary drum filter unit of the well-known belt discharge type. Such a filter unit comprises a usual upwardly opening tank or vat 10 which, in accordance with usual practice, will contain and continuously be supplied with an untreated raw sewage sludge or other mixture of liquid and solid matter to be subjected to the filtering operation.

Fixed on a rigid frame F adjacent to the end walls of the tank are suitable bearings such as 11 and 12 in which are rotatably journalled the supporting trunnions 14 and 16, respectively, of a cylindrical filtering drum 18. Normally, the drum will be rotated at a constant but relatively slow rotational speed as by means of a motor 20 transmitting its drive to the trunnions 14 of the drum through a conventional enclosed worm gear drive 22.

Spaced horizontally from the drum 18 with its relatively far side projected outside of the tank 10, is a discharge roll 24 having axially projecting stub shafts 26, by means of which it is rotatably supported in usual fixed bearings 28 on the frame F. There is provided an additional roll in the form of a return roll 30 which is interposed between the drum 18 and the discharge roll, adjacent and in near tangency with the drum 18. This return roll 30 may be supported by means of axially projecting stub shafts 32 at its opposite ends journalled respectively in bearings 34 supported on the frame F.

Disposed for movement in an endless circuit around the drum 18, discharge roll 24 and return roll 30, is a porous flexible filter medium in the form of an endless belt 36 which normally is driven by the drum and which may be formed of cloth fabric or other suitable porous material in accordance with usual practice.

The filter drum 18, except as specifically pointed out hereinafter, is of conventional construction, comprising circular ends 38 and 40 supported for rotation by the trunnions 14 and 16, respectively, and between these ends extends an imperforate cylindrical filter deck 42.

Encircling and projecting radially outwardly from the filter deck 42 at the opposite axial ends thereof are the annular end flanges or seals 43. Extending axially of the filter deck between such end flanges are a plurality of compartment strips and seals 44 and 46, respectively, which are best illustrated in FIG. 3 and which subdivide the periphery of the filter deck 42 between its end flanges 43 into a plurality of separate outwardly opening filter compartments, each designated 48 of uniform angular extent around the drum.

Each of the compartment strips 44 is of rigid metal construction comprising a channeled main portion defining an upwardly opening undercut or outwardly converging channel 50 for snug reception of a resilient tubular seal or sealing strip 46 which extends the full length of the channel between the end flanges or seals of the drum. On opposite sides of the seal 46, the compartment strip 44 preferably is formed with oppositely circumferentially extending grid retainer wings 52 having radially inwardly directed edges for cooperation in the manner hereinafter described with the drainage grids 54.

Each drainage grid 54 is curved concentrically to and supported on the filter deck 42 in its compartment, being coextensive with the compartment. Each such grid is provided with circumferentially directed retainer lugs 56 for reception beneath the inwardly directed edges of the retainer wings 52 of the compartment strips whereby to secure the grids in operative position. It will be understood that, while the grids are substantially rigid, they will normally be formed of a suitable plastic material, such as polypropeline. They will thus have sufficient resilient flexibility to permit insertion of the respective retainer lugs 56 into operative position beneath the downturned edges of the retainer wings 52.

The grids are formed in known manner to provide a multiplicity of openings therethrough permitting the free passage of liquid through the filter medium onto the decks 42 of the respective filter compartments, thence to suitable drainage channels 58, one of which is located in each filter compartment. Communicating with each filter compartment preferably through the bottom of its drainage channel, is a filtrate pipe 60 which extends through the interior of the drum to a conventional rotary valve member 62, defined in part by the end trunnion 16.

As will be apparent, the filter medium or cloth 64 is extended around the drum and is guided in an endless circuit around not only the drum, but thence around the discharge roll 24 and the return roll 30 and back on to the drum, the rotation of the drum being in a counter-clockwise direction as seen in FIG. 1. The lower part of the filter drum is immersed in the sludge or mixture of solids and liquids within the vat 10. The rotary vacuum control valve 62 above-mentioned, operates in response to rotation of the filter drum to maintain each of the filter compartments in communication with a source of suction, while the said compartment is immersed in the sludge and generally for a time thereafter. Normally, each compartment is placed in communication with the atmosphere as it approaches and moves past the location where the filter belt leaves the drum for movement toward and around the discharge roll. If desired, the rotary valve 62 may communicate with a source of pressurized air which is transmitted to each filter compartment in turn to effect a blow-back operation for assistance in removing the filter cake from the filter medium 64 in well-known manner.

It will be apparent that the discharge roll 24 simply exemplifies one of various suitable means for discharging the filter cake from the filter medium 64, this being due to the well-known fact that the discharge roll is of relatively small diameter, causing the filter medium to make a sharp curve in passing around it, whereby the less flexible filter cake will separate from the filter medium for discharge before the medium passes over the return roll 30 and thence back on to the filter drum 18.

However, in the filtration or dewatering of certain slurries or mixtures, such as undigested sewage sludges, a problem arises in that there is sufficient fiber in the sludges that the filter cake frequently tends to remain in large slabs or sections at the time of its discharge rather than to be broken up into smaller pieces as is desirable, for instance, to facilitate its further handling and/or incineration.

It will be appreciated that the construction and arrangement as thus far described are merely conventional, being generally similar to the disclosure of the R.O. Hawkes et al., U.S. Pat. No. 3,017,997 of Jan. 23, 1962.

In accordance with the present invention, the filter drum 18 itself is especially constructed and arranged so that during formation thereon of the filter cake, and throughout the application of suction to each filter compartment 48, the filter medium 64 is formed with a plurality of valleys 66 which induce the formation of mating channels and/or corrugations in the filter cake. Means are provided for removing the corrugations from the filter medium over each compartment 48, upon discontinuance of the suction therein. Such means may serve simply to tension and elongate the filter medium 64 in the direction of its path of travel relative to the less flexible filter cake, which tends to retain its corrugated shape and therefore to become freed from the filter medium.

Thus, in accordance with the preferred embodiment of the invention, the drainage grid 54 of each compartment is formed with its outwardly presented face having pairs of relatively spaced parallel upstanding ribs such as 54c, of greater radial height than the ribs 54a interposed between them, whereby to define on the surface of the grid member 54 between each pair of ribs 54c a valley 66 which, as will be seen, is in addition to the channels or openings between adjacent ribs. It will be apparent that mating corrugations are formed in the filter medium 36 by the application of suction to each of the compartments 48 throughout the time that the said compartment is immersed and the filter cake is formed thereon, the filter cake itself also assuming such channeled or corrugated form. After the formation of the filter cake over each compartment, discontinuance of the suction to such compartment and the departure of the filter medium from the drum 18 for movement toward and around the discharge roll 24 will withdraw the filter medium from the valleys 66 and cause it to assume a generally rectilinear or plane path between the drum 18 and roll 24, while the corrugations tend to remain in the less flexible filter cake, there being thus produced a separation or loss of adhesion between the filter cake and the filter medium. Also there is produced a pulling apart of the medium from the filter cake incident to the elongation of the filter medium relative to the inelastic and comparatively less flexible filter cake. The filter cake is thus readily freed from the filter medium and discharged in broken up form during its passage around the discharge roll.

Having thus described my invention, I claim:

1. In a filter unit of the class in which a cylindrical filter drum supported for rotation about a horizontal cylindrical axis, with its lower portion immersed in a slurry to be filtered, has its cylindrical face formed to define a plurality of separate radially outwardly opening filter compartments of uniform angular extent around the drum, a drainage grid coextensive with and occupying the opening of each compartment, a flexible liquid permeable filter medium extending circumferentially around the drum over a plurality of the drainage grids in said respective compartments, and coextensive in width with said grids, the improvement wherein each drainage grid is formed with a plurality of parallel upstanding ribs extending continuously thereacross on the radially outer face thereof for the full width of the filter medium, and with channels between said ribs, certain of said ribs being of greater radial height than the remaining ribs, whereby there is defined on the surface of said grid member a plurality of valleys in addition to the channels between adjacent ribs, and suction means communicating with each compartment for sucking said filter medium into said valleys to define in said medium corrugations which mate with said valleys, there being a discharge roll rotatably supported adjacent to the filter drum, said filter medium being disposed for movement around said drum and said discharge roll in an endless circuit in which said filter medium has a rectilinear portion between said drum and the discharge roll, and moving toward the latter, whereby said filter medium is elongated to eliminate said corrugations from the medium as it leaves the drum for movement toward the discharge roll.

2. A filter unit as defined in claim 1, in which said corrugations of each drainage grid extend there-across in a direction parallel to the cylindrical axis of the drum.

3. A filter unit as defined in claim 1, in which said corrugations of each drainage grid extend generally transversely to the direction of movement of the filter medium.

* * * * *